July 4, 1967     J. G. PADELT     3,329,075

FOCUSING MECHANISM FOR PHOTOGRAPHIC CAMERAS

Filed March 24, 1965     3 Sheets-Sheet 1

INVENTOR.
JOHANNES G. PADELT
BY
ATTORNEY

July 4, 1967        J. G. PADELT        3,329,075
FOCUSING MECHANISM FOR PHOTOGRAPHIC CAMERAS
Filed March 24, 1965        3 Sheets-Sheet 2

INVENTOR.
JOHANNES G. PADELT
BY
ATTORNEY

July 4, 1967  J. G. PADELT  3,329,075
FOCUSING MECHANISM FOR PHOTOGRAPHIC CAMERAS
Filed March 24, 1965  3 Sheets-Sheet 3

INVENTOR.
JOHANNES G. PADELT
BY
ATTORNEY

United States Patent Office 3,329,075
Patented July 4, 1967

3,329,075
FOCUSING MECHANISM FOR PHOTOGRAPHIC CAMERAS
Johannes G. Padelt, Rochester, N.Y., assignor to Graflex, Inc., Rochester, N.Y., a corporation of Delaware
Filed Mar. 24, 1965, Ser. No. 442,458
14 Claims. (Cl. 95—45)

ABSTRACT OF THE DISCLOSURE

A focusing mechanism for a camera having a cylindrical lens barrel surrounded by a rotatable plastic focusing ring, which has an integral flexible tab that engages in a helical groove in the barrel to shift the barrel axially when the focusing ring is rotated. A second plastic ring mounted within the focusing ring has an integral flexible lug engaging in an axially-extending straight groove in the barrel to hold the barrel against rotation during focusing.

---

The present invention relates to photographic cameras, and more particularly to the focusing mechanism for such cameras.

There are various types of focusing mechanisms used at present on cameras. Some employ a pin on the focusing ring engaging a helical slot on the lens barrel to effect the in-and-out focusing movement of the lens. In others a rack and pinion or compound screw sleeves are used. With all these prior types of focusing mechanisms there is inherently backlash; and it is difficult to eliminate it. The known pin and slot mechanism, for instance, is subject to wear in use; and as it wears, unless some means is provided to compensate for wear, the backlash increases, and focusing is not precise. In the copending U.S. patent application of Archie H. Gorey, Ser. No. 343,710, filed Feb. 10, 1964, now Patent No. 3,254,585, however, there is disclosed a focusing mechanism, which is free from backlash not only initially but for the whole life of the focusing mechanism. It has a lens barrel with a helical slot in it that governs the focusing adjustment, and it utilizes a flexible, plastic actuating ring with an integral lug on it that engages in the helical slot to effect the in and out movement of the lens barrel upon rotation in one direction or the other of the focusing ring. The flexibility of the plastic ring and its lug eliminates backlash.

The primary object of this invention is to provide an improved focusing mechanism of the type disclosed in the Gorey application.

To this end one object of the invention is to provide a lens focusing mechanism which will be more precise and in which the lug of the actuating ring will match the helical groove with proper precision.

To this end, also, another object of the invention is to provide a focusing mechanism which is less costly to manufacture. Thus one purpose of the invention is to provide a focusing mechanism which will permit of greater manufacturing tolerances between the outside diameter of the lens barrel and the bore of the nose piece of the focusing mount while still maintaining absence of backlash. With this aim also it is a purpose of the invention to provide a focusing mechanism in which the focusing ring and the plastic actuating ring are made in one piece.

Other objects of the invention will be apparent hereinafter from the specification and from the recital of the appended claims, particularly when read in conjunction with the accompanying drawings.

Figure 3:
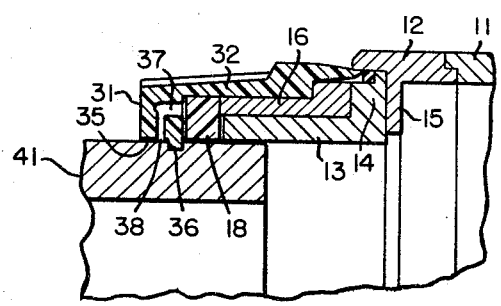
FIG. 3 is a fragmentary sectional view taken along the line 3—3 in FIG. 1 looking in the direction of the arrows.
Figure 2:
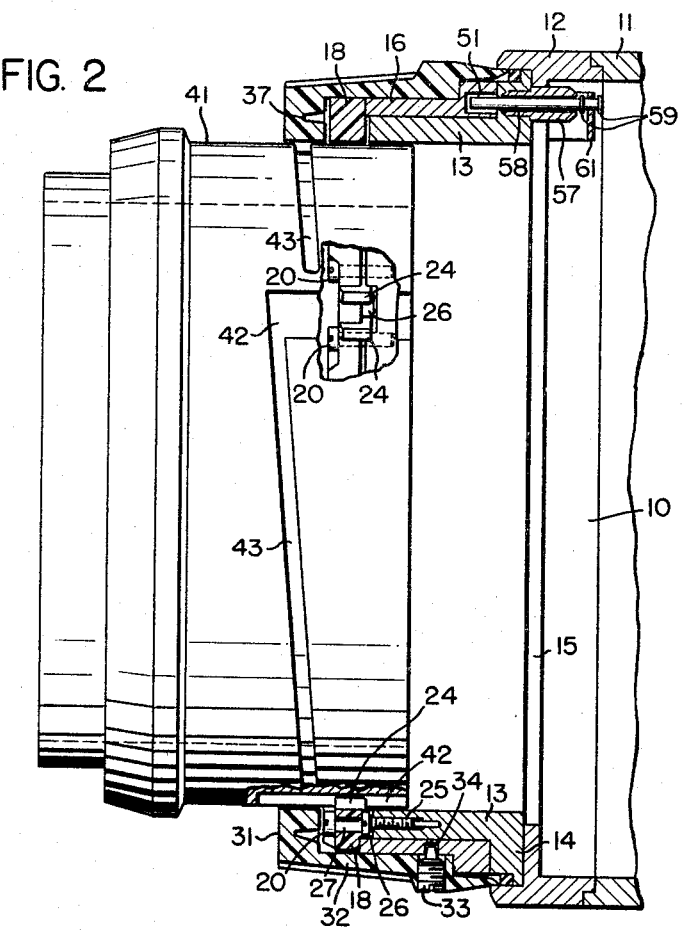
FIG. 2 is a fragmentary sectional view taken along the line 2—2 in FIG. 1 looking in the direction of the arrows, certain parts again being broken away.

Referring now to the drawings by numerals of reference, 10 denotes the nose-piece or lens mount, which projects from the forward end of a camera housing 11, part of which is illustrated fragmentarily in FIGS. 2 and 3. Secured in the forwardly-protruding generally annular portion 12 of the nose-piece or mount 10 coaxially thereof is a sleeve 13. At its rear end sleeve 13 has an external, circumferential flange 14, which seats against the outer face of an internal annular shoulder 15 formed in the mount 10.

Mounted for rotation on the sleeve 13 for rotation coaxially thereabout is an annular bearing 16, the inner end of which has a circumferential flange seating against the flange 14 on the sleeve 13. At its outer end the sleeve 13 has secured thereto a guide ring 18, the inner face of which engages the outer end of the bearing 16. The ring 18, which is made of "Delrin" or like flexible plastic material, is secured to the outer end of the sleeve 13 at each of three equi-angularly spaced slightly thicker portions by a pair of screws 20, the shanks of which pass through the ring 18 and thread into the outer end of the sleeve 13. Integral with ring 18, and projecting radially inwardly thereof between each pair of screws 20 is a pair of closely spaced lugs 24, the purpose of which will be described in more detail below.

Threaded into the outer end of sleeve 13 beneath the ring 18, and substantially midway between the two screws 20 of each pair, is a jack-up screw 25 having a head 26. Each jack-up screw registers with a hole 27 extending through the ring 18. The diameter of each aperture 27 is large enough to permit the driving end of a screwdriver to be inserted therethrough into engagement with the head 26 of the registering screw, but is of slightly smaller diameter than the head 26, so that when a screw 25 is rotated in a direction to thread it out of the sleeve 13, its head will engage the inside face of the ring 18 between the pair of associated screws 20.

During assembly, the screws 25 are first threaded home against the ring 13, after which the ring 18 is secured over the outer end of the bearing 16 by the screws 20. Before the screws 20 are threaded home against the ring 18, shims of predetermined thickness, say .002", are inserted between the confronting surfaces on the ring 18 and the bearing 16 at the screw areas. The screws 20 are then threaded up to just touch the front face of guide ring 18. Then the screws 25 are backed off by a screwdriver, and the shims are removed. The heads 26 of the screws 25 flex the ring 18 between each pair of screws 20, causing the outer marginal edge of the ring 18 to urge the bearing 16 axially rearwardly against the sleeve 13. This makes for smooth and playless action of the focusing ring.

Mounted over the ring 18 coaxially thereof is a focusing ring 31, which is also made of "Delrin," or a similar flexible plastic material. The ring 31 has a sleeve portion 32, which surrounds the bearing 16 coaxially thereof, and which is secured to the bearing to rotate therewith by a plurality of equi-angularly spaced screws 33, only one of which is illustrated in FIG. 2. These screws thread into sleeve portion 32 and engage at their inner ends in holes 34 in the bearing 16.

Figure 1:
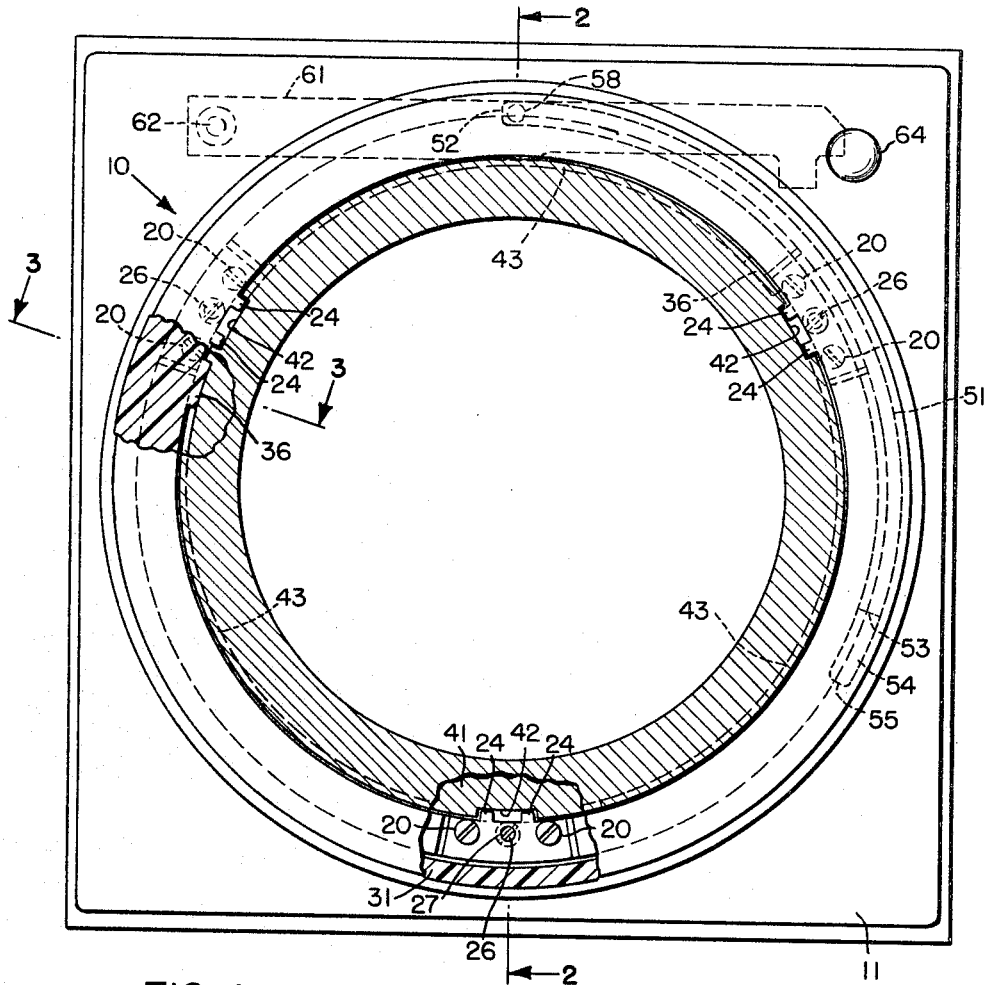
FIG. 1 is a fragmentary front elevational view of a camera and of a focusing mechanism therefor built according to one embodiment of this invention, portions of the focusing mechanism being cut away and shown in section.

Integral with ring 31, and projecting radially inwardly therefrom are three, equi-angularly spaced lugs 36 (FIGS. 1 and 3). In its inner face ring 31 is provided with a shallow, annular recess 37 (FIGS. 2 and 3), the open end of which confronts ring 18 coaxially thereof. Beneath each lug 36 the ring 31 is provided with a radial slot 38 (FIG. 3), which communicates with the annular recess 37 to render each lug 36 slightly flexible in an axial direction relative to ring 31.

Mounted in the registering bores of sleeve 13 and rings 18 and 31, is a cylindrical lens barrel 41. In its outer surface barrel 41 has three straight, equi-angularly spaced slots 42, which extend forwardly from the inner end of the barrel parallel to its axis, and three helical grooves 43, each of which communicates at one end thereof with one of the slots 42. Each of the slots 42 has engaged therein one of the pairs of lugs 24 carried by the ring 18; and each of the grooves 43 is engaged by one of the lugs 36 on the focusing ring 31. When the ring 31 is rotated to effect focusing adjustment of the lens, then, the lugs 24 prevent the lens barrel 41 from rotating, and the lugs 36 on the focusing ring cause the lens barrel 41 to shift axially.

Figure 4:
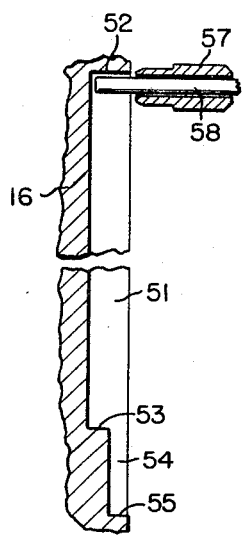
FIG. 4 is a developed sectional view showing the means for limiting the angular movement of the focusing ring.

The angular movement of the focusing ring 31 is limited by a pin 58 (FIGS. 2 and 4) which is reciprocable in a bushing 57 that is secured in the mount 10. This pin at its front end engages in a recess or cut-out portion 51 (FIG. 4) formed in the bearing 16. This recess is of uniform depth for the major portion of its arcuate length but adjacent one end for a short portion of its length is of shallower depth. Ordinarily, the pin by its engagement with the shoulders 52, 53, which are at opposite ends of the deeper portion of the recess 51, limits the angular movement of the lens barrel so that it cannot be withdrawn from the lens mount.

Shoulder or stop 52 is the infinity stop for the lens barrel movement; and shoulder 53 is the stop defining the closeup adjustment position of the lens barrel. Stop or shoulder 55 is the position of alignment of correspondingly angularly positioned lugs 36 and 24.

The pin 58 is withdrawn from the deeper into the shallower part of the groove or recess 51 by pushing on a push rod 64 (FIG. 1), which is slidable in the front of the camera housing or lens board 11. This push rod engages at its rear end against one end of a leaf spring 61 (FIG. 1), which is secured intermediate its ends between the shoulders 59 (FIG. 2) on the pin 58. At its opposite end the leaf spring 61 is fastened by a screw 62 or the like to the rear face of the lens board or support 11. The spring 61 is tensioned to urge the pin 58 and the push rod 64 forwardly.

To remove the lens barrel from the camera or to insert it therein, the focusing ring 31 is rotated so that the pin 58 moves toward the shallower end of the cut-out or recess 51, and the pin 58 is pulled rearwardly into the shallower part 54 of the recess. When the pin abuts against the end wall or shoulder 55 of the recess, the lugs 36 of the ring 31 will align with the slots 42 in the barrel 41 and with the pairs of lugs 24 on the ring 18. Then the lens barrel can be pulled forwardly out of the lens mount.

When a lens barrel is inserted in the focusing ring, and the focusing ring is rotated, the pin 58 will snap automatically into the deeper portion of the cut-out or groove 51, and limit the movement of the focusing ring so that lugs 36 will not register with slots 42 and lugs 24. Therefore, accidental disengagement of the lens barrel and focusing mount will be prevented.

As stated the guide ring 18 is made of plastic. Now it is always desirable to eliminate rotational play between the lens barrel and the focusing mount, because such play creates errors in focusing. The play can only be eliminated by having the keys in the lens mount fit quite snugly the longitudinal grooves in the lens barrel. In the normal lens mount this cannot be done because allowance has to be made for angular tolerance between the grooves and the keys. It would be impractical, of course, to make a lens barrel to fit a particular lens mount. Lens barrels have to be made commercially in quantity; and lens mounts have to be made commercially in quantity also; and any lens mount has to take any lens barrel, even though the lens barrels may vary from one to another in diameter by some thousandths of an inch and likewise the internal diameters of the bores of the lens mounts which receive the barrels may also vary from one another in diameter by some thousandths of an inch.

The problems that this situation presents, so far as holding the lens barrel against rotational play in the lens mount, has been overcome through the present invention by reason of the use of a plastic ring 18 and by making the keys 24 on the ring 18 to fit the grooves 42 in the lens barrel so snugly as to eliminate rotational play between lens mount and barrel, and by always making the lens barrel smaller in diameter than the minimum acceptable internal diameter of the bore of the lens mount. Then, in effect, the barrel will float into position radially and center itself when the three pairs of keys 24 on the ring 18 engage the three grooves 42 in the lens barrel 41.

Figure 5:
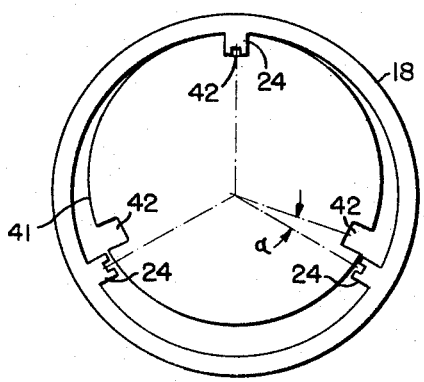
FIGS. 5 and 6 are diagrammatic views illustrating exaggeratedly how the improved construction of the present invention permits of greater tolerances in manufacture while enabling elimination of backlash.
Figure 6:
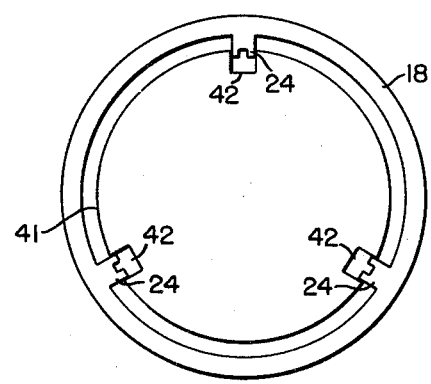

This is illustrated diagrammatically and on a very exaggerated scale in FIGS. 5 and 6. By providing radial clearance between ring 18 and lens barrel 41, the barrel 41 can move radially as required to permit all three pairs of lugs 24 to fit in all three grooves 42 even though the lugs 24 are made to fit the grooves 42 very snugly. In FIG. 5 the lens barrel has the maximum diametral tolerance with reference to the ring 18, and is shown in one of its extreme radial positions, wherein the lugs 24 engage only one of the grooves 42, its other grooves being angularly displaced $\alpha$ degrees from the other lugs. By downward displacement of lens barrel 41 as shown in FIG. 6, however, the ring 18 and lens barrel 41 will align automatically with all three pairs of lugs 24 fitting into all three grooves 42 in the lens barrel. The lens barrel will thus be centered and held in proper engagement with the ring 18. Of course, as stated, the conditions are greatly exaggerated in FIGS. 5 and 6.

Another major advantage of the novel focusing mechanism described herein is that the resilient, plastic lugs 36 on the focusing ring 31, fit snugly into the helical grooves 43 in the lens barrel and thereby help assure extreme accuracy in focusing. Moreover, since these lugs 36 are molded integral with the focusing ring 31 they may be more precisely shaped and located to match the helical grooves 43 in the lens barrel with the proper pretension, than were the lugs and the focusing ring 31 to be made as separate parts, and simply fastened together. Furthermore, the focusing ring with integral lugs is less costly to make than two separate parts.

Figure 7:
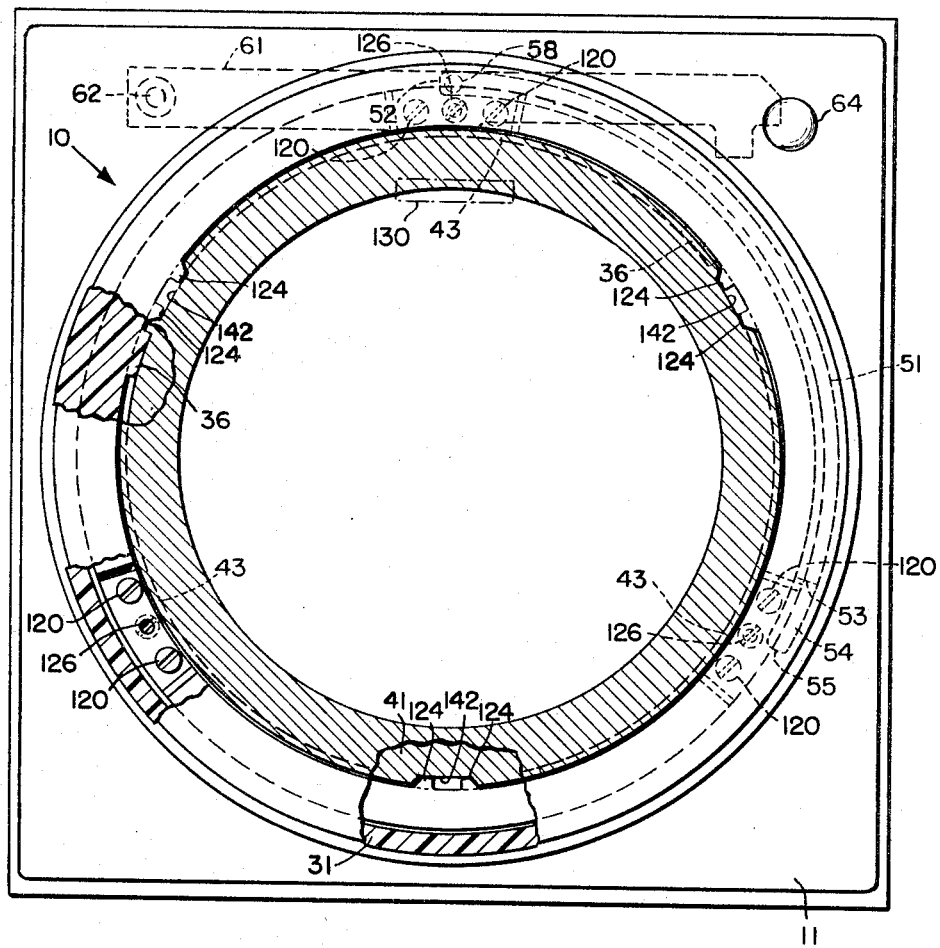
FIG. 7 is a fragmentary front elevational view of a camera and focusing mechanism therefor built according to a modified embodiment of this invention, parts being cut away and shown in section.
Figure 8:
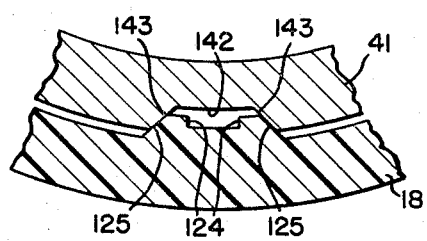
FIG. 8 is an enlarged fragmentary view of part of the focusing mechanism illustrated in FIG. 7.

In the modified embodiment as shown in FIGS. 7 and 8, wherein like numerals are employed to designate elements identical to those employed in the embodiment shown in FIGS. 1 to 6, ring 18 is secured to the outer end of the sleeve 13 at each of three equi-angularly spaced points thereabout by a pair of screws 120, which thread through the ring 18 and into the outer end of sleeve 13. A jack-up screw, which is similar to screw 25, is threaded into the outer end of sleeve 13 between each pair of screws 120 with its head 126 disposed beneath the ring 18, where it is accessible to a screwdriver. The ring 18 is also provided with three, equi-angularly spaced pairs of radial lugs 124, but unlike the lugs 24 in the first embodiment, each pair of lugs 124 is positioned midway of adjacent pairs of the fastening screws 120, or, in other words, is angularly spaced 60° from adjacent pairs of screws 120.

Moreover, in this second embodiment, the outer edges 125 of each pair of lugs 124 are beveled or tapered to converge inwardly toward one another. Correspondingly inclined inwardly-converging surfaces 143 are formed along opposite sides of each of the straight grooves or slots 142 formed in the periphery of the barrel 41, like slots 42 in the first embodiment, to accommodate the lugs 124.

The outside surfaces 125 of the lugs 124 of each pair are spaced slightly further apart than the two sides 143 of a groove 142 so that there is a slight interference between lugs and grooves. With the construction of this second embodiment of the invention the guide lugs 124 can flex and will engage the grooves so tightly as to prevent any rotation of the lens barrel 41 during focusing, and will compensate for minor angular misalignments between the lugs 124 and grooves 142. Thus, when a barrel is inserted into the guide ring 18, the guides or lugs 124 will flex slightly outwardly, but will engage firmly and resiliently with the grooves 142 preventing rotation of the barrel during focusing. Hence, the range finder cam 130, illustrated by broken lines in FIG. 7, within the barrel cannot transmit any error due to rotation backlash of the barrel. Moreover, if the lugs 124 do not align properly with the grooves 142 on the barrel, this misalignment may be compensated for by adjusting the jack-up screws 126 between the screws 120, thereby to flex the ring 18 and effect a slight shifting of its lugs 124.

While the invention has been described in connection with at least two embodiments thereof, it will be understood that it is capable of further modification, and this application is intended to cover any variation, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A focusing mechanism for photographic cameras, comprising
   (a) a bored lens mount,
   (b) a lens barrel removably disposed in the bore of said mount and having a helical groove around its periphery, and
   (c) a plastic focusing ring rotatably mounted on said lens mount and surrounding said barrel coaxially thereof, and having a flexible tab integral therewith and slidably engaged in said groove to effect axial movement of said barrel upon rotation of said focusing ring, said focusing ring having therein a recess adjacent said tab thereby to permit a slight flexing of said tab in the axial direction of said barrel upon rotation of said focusing ring.

2. A focusing mechanism for photographic cameras, comprising
   (a) an annular support,
   (b) an axial slidable lens barrel removably disposed at its inner end in said support, and having in its outer surface a helical groove, which extends around the barrel axis, and a straight, axially parallel groove, which extends forwardly from the inner end of said barrel and communicates with one end of said helical groove,
   (c) a focusing ring rotatable on said support, and having an integral, internally-disposed flexible tab engaging in said helical groove to effect axial shifting of said lens barrel upon rotation of said ring, and
   (d) adjustable means interposed between said focusing ring and said support for holding said ring against axial movement relative to said support upon rotation of said ring.

3. A focusing mechanism as defined in claim 2, wherein said means comprises
   (a) a rotatable sleeve secured to said focusing ring for rotation therewith coaxially of said support,
   (b) a flexible plastic ring surrounding said barrel and secured to said support coaxially thereof, and engaging the outer end of said sleeve resiliently to urge it axially against said support, and
   (c) means interposed between said plastic ring and said support and adjustable to flex said plastic ring in a manner to increase and decrease, selectively, the axial force exerted by said plastic ring on said sleeve.

4. A focusing mechanism as defined in claim 3, wherein the last-named means comprises a screw threaded into said support beneath said plastic ring, and having a head which is engageable with the inside face of said plastic ring to flex said ring toward said sleeve.

5. A focusing mechanism as defined in claim 4, wherein
   (a) said plastic ring has therethrough an opening, which registers with the head of said screw, and
   (b) the diameter of said opening is less than the diameter of said head.

6. A focusing mechanism as defined in claim 3, wherein said plastic ring has an integral, internally-disposed lug, which engages in said straight groove to hold said barrel against rotation during the rotation of said focusing ring.

7. A focusing mechanism as defined in claim 3, including
   (a) a pin reciprocable relative to said support and engageable in an arcuate recess in said sleeve, said recess being of one depth for a portion of its angular extent and of shallower depth for the remainder thereof, the end walls of the first-named portion of said recess serving to limit rotation of said focusing ring and focusing movement of said lens barrel, and to prevent said tab from aligning with said straight groove, and
   (b) means for disengaging said pin from said first named portion of said recess to permit it to enter the shallower portion thereof thereby to permit rotation of said focusing ring to a position in which said tab aligns with said straight groove so that said lens barrel can be removed from said support by axial sliding movement of said barrel.

8. A focusing mechanism as defined in claim 7, including
   (a) a spring connected to said pin and constantly urging it toward position of full depth engagement with said recess, and
   (b) a push rod connected to said pin and manually operable to move said pin out of said full depth position.

9. A focusing mechanism for photographic cameras, comprising
   (a) an annular lens mount,
   (b) an axially slidable lens barrel removably disposed in the bore of said mount coaxially thereof and having in its outer peripheral surface a straight, axially extending groove, and a helical groove, which extends about the barrel axis and communicates at one end with said straight groove,
   (c) a sleeve coaxially rotatable on said mount with one end thereof projecting axially beyond the forward end of said mount,
   (d) a first, flexible plastic ring surrounding said barrel and secured to said forward end of said mount coaxially thereof with its inner face engaging said one end of said sleeve resiliently to hold said sleeve against axial movement on said mount,
   (e) a second plastic ring surrounding said barrel and secured to said sleeve for rotation coaxially of said mount,
   (f) said first ring having an integral, internally disposed flexible lug engaging in said straight groove to hold said barrel against rotation relative to said mount, and (g) said second ring having an integral internally disposed flexible tab engaging in said helical groove to effect axial shifting of said barrel upon rotation of said second ring.

10. A focusing mechanism as defined in claim 9, wherein (a) said barrel has in its outer peripheral surface two further, straight, axially extending grooves which are angularly spaced about said barrel axis approximately 120° from one another and from the first-named straight groove, (b) said first ring has two further, internally-disposed flexible lugs angularly spaced about the axis of said first ring approximately 120° from one another and from the first-named lug, and (c) the inner diameter of said first ring is sufficiently larger than the outside diameter of said barrel so that the latter may be shifted slightly radially relative to said first ring, when necessary to effect proper registry of said lugs with said straight grooves.

11. A focusing mechanism as defined in claim 9, wherein (a) said sleeve has in its annular wall an angular recess, which extends about the axis of said sleeve for approximately 120°, and which is of one depth for approximately 110° of its extent and of shallower depth for the remainder of its extent, (b) a pin mounted in said mount to reciprocate between a first position, in which it engages in the deeper part of said one recess, and a second position in which it engages in the shallower part of said recess and said tab on said second ring is in registry with said straight groove, (c) spring-loaded means constantly urging said pin into engagement with said recess, said pin operating, when in engagement with the deeper part of said recess to limit the axial focusing movement of said lens barrel and to prevent removal of the lens barrel from said mount, and (d) manually-operable means for disengaging said pin from the deeper part of said recess to permit rotation of said second ring to a position in which said tab aligns angularly with said straight groove, so that said lens barrel may be removed axially from said mount.

12. A focusing mechanism as defined in claim 9, including manually adjustable means interposed between said mount and said first ring and operable to flex said first ring a predetermined amount in an axial direction thereby to adjust the axial force exerted by said first ring on said one end of said sleeve.

13. A focusing mechanism for photographic cameras comprising (a) an annular lens mount, (b) an axially slidable lens barrel removably disposed in the bore of said mount and having in its peripheral surface a plurality of equi-angularly spaced straight grooves extending parallel to its axis, and a helical groove extending about said axis, said barrel having an external diameter slightly less than the internal diameter of the bore of said mount, (c) a focusing ring rotatable on said mount, (d) a tab carried by said ring engaging in said helical groove to move said barrel axially upon rotation of said ring, and (e) an annular member surrounding said barrel and fixed to said mount and having a plurality of equi-angularly spaced lugs integral therewith and engageable, respectively, in said straight grooves substantially without backlash, to prevent rotation of said barrel upon rotation of said ring, said lugs being deep enough to maintain engagement with said grooves while permitting adjustment of said barrel radially in said mount to a position in which barrel and mount are coaxial, (f) said member being plastic and said lugs fitting said straight grooves snugly to eliminate rotational play between said member and said lens barrel, (g) opposite sides of each of said straight grooves diverging outwardly from the bottom of the associated groove, and (h) the outer marginal edges of each of said lugs converging inwardly to form on each lug a pair of inclined surfaces complementary to the sides of one of said straight grooves.

14. A focusing mechanism as defined in claim 13, including adjustable means interposed between said annular member and said mount and disposed midway angularly between adjacent ones of said plurality of lugs to flex said member in a direction axially of its axis thereby to shift said lugs to take up any backlash between them and the grooves in which they engage.

References Cited

UNITED STATES PATENTS 3,254,585   6/1966   Gorey _____ 95—45

JOHN M. HORAN, *Primary Examiner.*